United States Patent
Fry et al.

(10) Patent No.: US 9,251,358 B2
(45) Date of Patent: Feb. 2, 2016

(54) SYSTEM AND METHOD FOR PROVIDING SECURE ACCESS TO SYSTEM MEMORY

(75) Inventors: Walter G. Fry, Houston, TX (US); Valiuddin Y. Ali, Cypress, TX (US); Manuel Novoa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 12/991,861

(22) PCT Filed: May 9, 2008

(86) PCT No.: PCT/US2008/063280
§ 371 (c)(1),
(2), (4) Date: Nov. 9, 2010

(87) PCT Pub. No.: WO2009/136944
PCT Pub. Date: Nov. 12, 2009

(65) Prior Publication Data
US 2011/0064217 A1    Mar. 17, 2011

(51) Int. Cl.
*G06F 21/62* (2013.01)
*G06F 21/78* (2013.01)

(52) U.S. Cl.
CPC ............... *G06F 21/62* (2013.01); *G06F 21/78* (2013.01)

(58) Field of Classification Search
USPC ........................................................ 726/27
See application file for complete search history.

(56) References Cited

U.S. PATENT DOCUMENTS

| | | | |
|---|---|---|---|
| 7,330,970 B1 * | 2/2008 | Field | 713/165 |
| 2003/0105968 A1 | 6/2003 | Cheston et al. | |
| 2003/0140238 A1 | 7/2003 | Turkboylari | |
| 2008/0077807 A1 | 3/2008 | Hicks | |

FOREIGN PATENT DOCUMENTS

WO    WO-2005091108    9/2005

OTHER PUBLICATIONS

Intellectual Property Office, Examination Report under section 18(3), Appln No. GB1018909.0, date of mailing Feb. 2, 2012, 2 p.
International Searching Authority, International Search Report and Written Opinion dated Jan. 29, 2009, pp. 11.

* cited by examiner

*Primary Examiner* — Jacob Lipman
(74) *Attorney, Agent, or Firm* — International IP Law Group

(57) ABSTRACT

There is provided a method of providing secure access to data stored in a system memory of a computer system, the computer system comprising a memory controller for writing data to and reading data from the system memory. The method comprises generating a random encryption key each time the computer system is booted and storing the random encryption key in a volatile memory region of the memory controller. The method additionally comprises encrypting data using the random encryption key to create encrypted data, and storing the encrypted data in the system memory. Also provided are a memory subsystem and a computer system for performing the method.

20 Claims, 3 Drawing Sheets

100

200

SYSTEM AND METHOD FOR PROVIDING SECURE ACCESS TO SYSTEM MEMORY

BACKGROUND

In a typical computer system, system memory is used as a temporary storage for security keys and credentials among other things. In recent times, hackers have begun attempting to gain illicit access to secure data by physically removing memory modules from a user's computer, possibly freezing the memory modules to delay decay of the data contained therein. The hacker subsequently installs the stolen memory modules into another computer to read their contents. In such a manner, hackers may be able to retrieve the security keys and credentials stored in the memory modules and use the stolen information to gain unauthorized access to sensitive data of the user.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
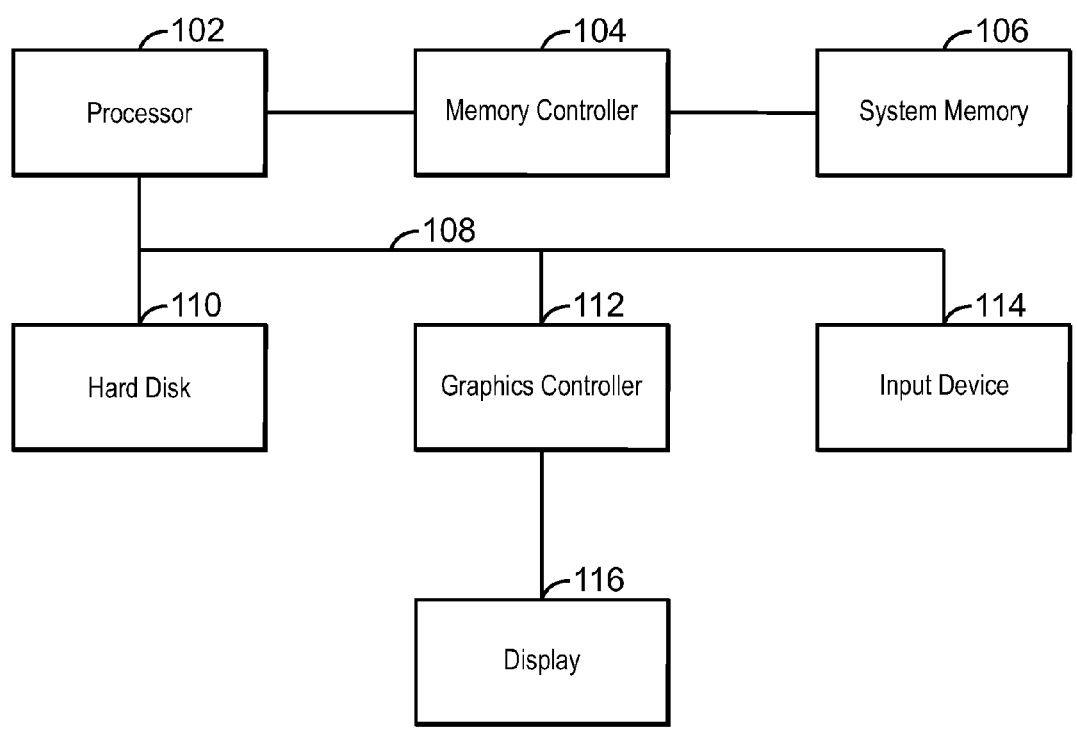
FIG. 1 is a block diagram of a computer system according to an exemplary embodiment of the present invention.

FIG. 1 is a block diagram of a computer system according to an exemplary embodiment of the present invention. The computer system is generally referred to by the reference number 100. Those of ordinary skill in the art will appreciate that the computer system 100 may comprise hardware elements including circuitry, software elements including computer code stored on a machine-readable medium or a combination of both hardware and software elements. Additionally, the functional blocks shown in FIG. 1 are but one example of functional blocks that may be implemented in an exemplary embodiment of the present invention. Those of ordinary skill in the art would readily be able to define specific functional blocks based on design considerations for a particular computer system.

A processor 102, such as a central processing unit or CPU, is adapted to control the overall operation of the computer system 100. The processor 102 is connected to a memory controller 104, which is adapted to read data to and write data from a system memory 106. The memory controller 104 may comprise memory that includes a non-volatile memory region and a volatile memory region. As set forth in detail below, an exemplary embodiment of the present invention is adapted to prevent data theft by providing secure communication between the memory controller 104 and the system memory 106.

The system memory 106 may be comprised of a plurality of memory modules, as will be appreciated by one of ordinary skill in the art. In addition, the system memory 106 may comprise non-volatile and volatile portions. A system basic input-output system (BIOS) may be stored in a non-volatile portion of the system memory 106. The system BIOS is adapted to control a start-up or boot process and to control the low-level operation of the computer system 100.

The processor 102 is connected to at least one system bus 108 to allow communication between the processor 102 and other system devices. The system bus may operate under a standard protocol such as a variation of the Peripheral Component Interconnect (PCI) bus or the like. In the exemplary embodiment shown in FIG. 1, the system bus 108 connects the processor 102 to a hard disk drive 110, a graphics controller 112 and at least one input device 114. The hard disk drive 110 provides non-volatile storage to data that is used by the computer system. The graphics controller 112 is in turn connected to a display device 116, which provides an image to a user based on activities performed by the computer system 100.

Figure 2:
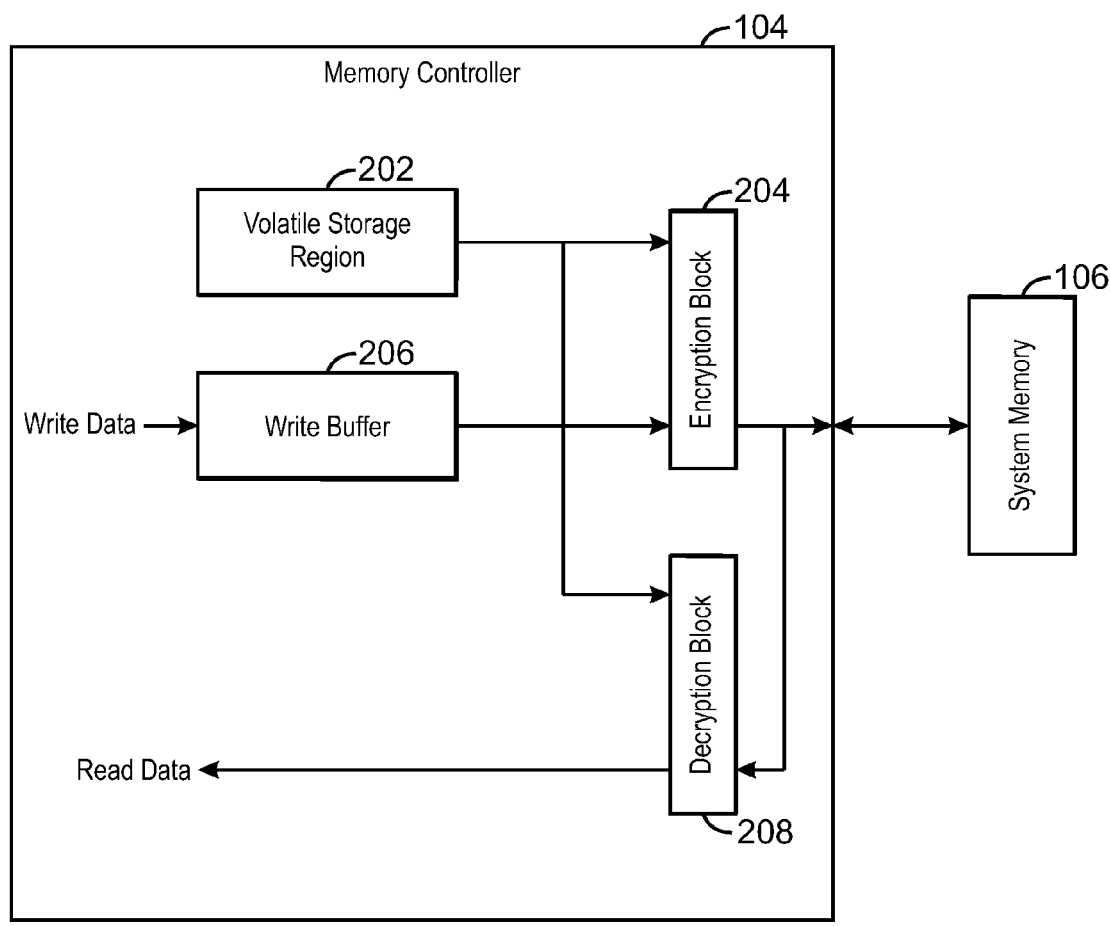
FIG. 2 is a block diagram of a memory subsystem of the computer system shown in FIG. 1 according to an exemplary embodiment of the present invention.

FIG. 2 is a block diagram of a memory subsystem of the computer system shown in FIG. 1 according to an exemplary embodiment of the present invention. The memory subsystem is generally referred to by the reference number 200. The memory subsystem 200 comprises the memory controller 104 and the system memory 106.

When the computer system 100 is booted or otherwise receives a system reset, the memory controller 106 receives a random encryption key, which is stored in a volatile memory region 202. In one exemplary embodiment of the present invention, the volatile memory region 202 comprises a write-only/write-once register that is reset via system reset. The random encryption key may be generated by a system BIOS, which performs various initialization functions when the computer system is booted. As explained in detail below, the random encryption key is used to encrypt data that is written to the system memory 106.

In one exemplary embodiment of the present invention, subsequent random encryption keys are selectively used by the memory controller 104 to encrypt data. The subsequent random encryption keys may be generated, for example, by the memory controller 104. Alternatively, the subsequent random encryption keys may be provided by another component of the computer system 100, such as the system BIOS. If subsequent random encryption keys are used, different areas of the system memory 106 would be encrypted with different random encryption keys. The use of multiple random encryption keys makes it difficult for a hacker to use a number generator to identify all of the random encryption keys used to encrypt the contents of the system memory 106.

An encryption block 204 of the memory controller 104 uses the current random encryption key to encrypt all data that is written to the system memory 106. In one exemplary embodiment of the present invention, a simple encryption algorithm such as an XOR algorithm may be used by the encryption block 204 to minimize the impact on throughput of the memory subsystem 200. An exemplary XOR algorithm comprises performing an XOR operation using the data written to system memory and the random encryption key. The following example illustrates how an exemplary embodiment of the present invention provides enhanced security for data stored in system memory. Assume that data elements A and B are to be written to system memory after having been XOR encrypted using a random encryption key R. This process may be described using the following equations:

$$A \oplus R = C$$

$$B \oplus R = D$$

where C is the encrypted version of A and D is the encrypted version of B. The encrypted data C and D are stored in system memory rather than A or B themselves. With some mathematical manipulation, the following result is obtained:

$$C \oplus D = A \oplus B$$

Thus, a knowledgeable hacker might be able to manipulate data from a stolen memory module to recreate some conglomeration of A and B. Nonetheless, it would remain extremely difficult to obtain A and B themselves without access to the random encryption key R. The use of an exemplary embodiment of the present invention significantly increases the difficulty of making an unauthorized recovery of data from system memory Those of ordinary skill in the art will appreciate that encryption algorithms other than XORing a random encryption key with data to be written to system memory may be used to encrypt data that is written to the system memory 106. Moreover, the specific encryption algorithm employed by the encryption block 204 is not an essential feature of the present invention.

When encrypted data is read from the system memory 106, it is decrypted by a decryption block 208 within the memory controller 104. The decryption block 208 performs the decryption using the random encryption key that was used to perform the encryption of the data by the encryption block 204. The decrypted data may then be provided to the processor 102. An exemplary embodiment of the present invention provides enhanced data security by writing only encrypted data to the system memory 106.

By storing the random encryption key in a volatile memory region within the memory controller 104, an exemplary embodiment of the present invention reduces the risk that a hacker or other potential data thief would be able to recover the encryption key and gain access to data that was encrypted with the particular random encryption key and subsequently stored in the system memory 106. The memory controller 104 could not be reverse engineered or "stripped" to determine the key because the value of the key would not be present in the non-volatile storage region 202 upon removal of power to the memory controller. This would prevent access to data which had been encrypted using the particular random encryption key even if the data stored in the system memory was somehow preserved, for example, by freezing memory modules comprising the system memory or the like.

Figure 3:
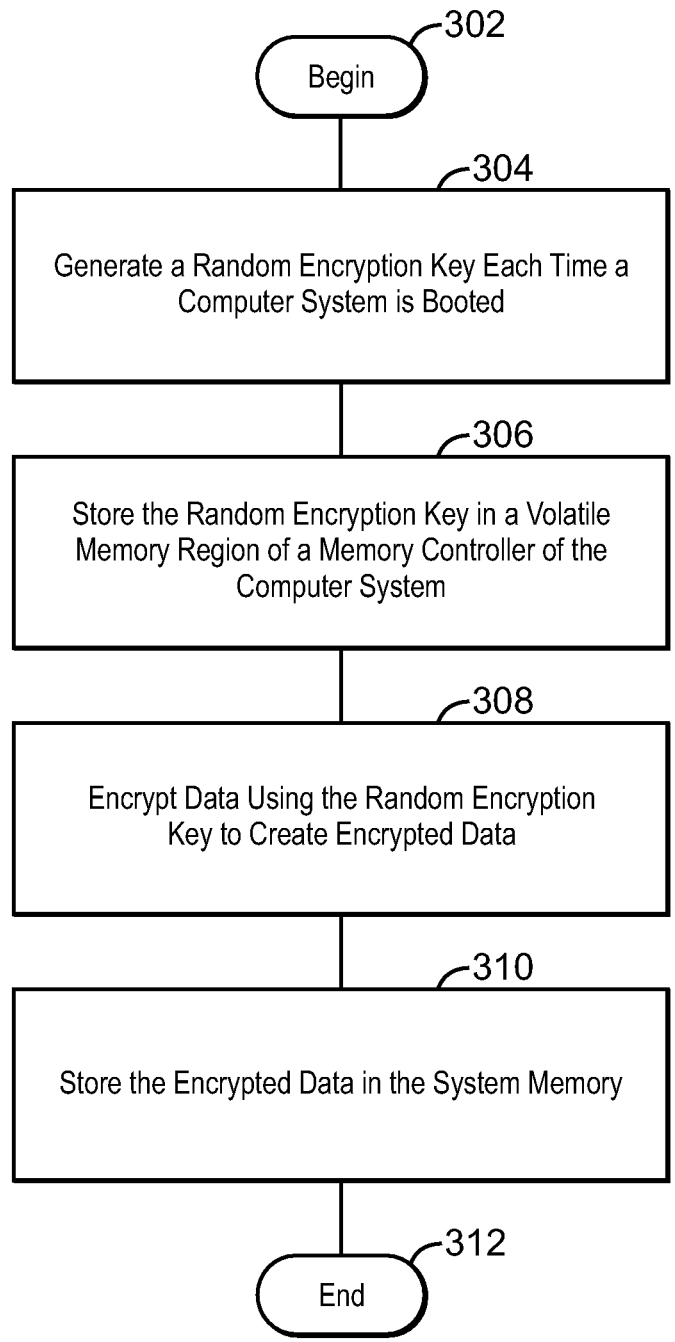
FIG. 3 is a flow chart showing a method of operating a protected system memory according to an exemplary embodiment of the present invention.

FIG. 3 is a flow chart showing a method of operating a protected system memory such as the system memory 106 (FIG. 1) according to an exemplary embodiment of the present invention. The method is generally referred to by the reference number 300. At block 302, the process begins.

At block 304, a random encryption key is generated each time a computer system such as the computer system 100 (FIG. 1) is booted. As shown at block 306, the random encryption key is stored in a volatile memory region of a memory controller such as the memory controller 104 (FIG. 1).

Data is encrypted using the random encryption key, as shown at block 308. The encrypted data is stored in the system memory, as shown at block 310. At block 312, the process ends.

An exemplary embodiment of the present invention provides a secure method of communication between a memory controller and a system memory comprised, for example, of a plurality of memory modules. Such an exemplary embodiment protects system memory from a wide range of hacker attacks. In particular, an exemplary embodiment of the present invention is adapted to protect system memory from physical attacks and boot attacks. Moreover, standard memory components and modules may be used. No additional effort is required when a new generation of memory technology is introduced. An exemplary embodiment of the present invention provides system memory security without significantly impacting system performance and without impacting operating system and software application performance. Finally, an exemplary embodiment of the present invention may be implemented with minimal impact on overall system cost and complexity.

What is claimed is:

1. A method of storing encrypted data in a system memory of a computer system, the computer system comprising a memory controller for writing data to and reading data from the system memory, the method comprising:
    generating a random encryption key each time the computer system is booted;
    storing the random encryption key in a volatile memory region of the memory controller;
    encrypting data using the random encryption key to create encrypted data; and
    storing the encrypted data in the system memory.

2. The method recited in claim 1, comprising:
    reading the encrypted data from the system memory; and
    decrypting the encrypted data using the random encryption key.

3. The method recited in claim 1, wherein the volatile memory region of the memory controller comprises a write-only/write-once register.

4. The method recited in claim 1, comprising resetting the volatile memory region of the memory controller when a system reset is performed.

5. The method recited in claim 1, wherein encrypting the data comprises performing an XOR operation using the data and the random encryption key.

6. The method recited in claim 1, wherein the random encryption key is generated by a system basic input-output system (BIOS) each time the computer system is booted.

7. The method recited in claim 1, comprising:
    generating at least one subsequent random encryption key; and
    encrypting data using the at least one subsequent random encryption key.

8. A memory subsystem of a computer system, the memory subsystem comprising:
    a memory controller that is adapted receive a random encryption key each time the computer system is booted, to store the random encryption key in a volatile memory region in the memory controller, to use the random encryption key to encrypt data, and to store encrypted data in a system memory.

9. The memory subsystem recited in claim 8, wherein the memory controller is adapted to read the encrypted data from the system memory, and to decrypt the encrypted data using the random encryption key.

10. The memory subsystem recited in claim 8, wherein the volatile memory region of the memory controller comprises a write-only/write-once register.

11. The memory subsystem recited in claim 8, wherein the volatile memory region of the memory controller is reset when a system reset is performed.

12. The memory subsystem recited in claim 8, wherein the memory controller is adapted to encrypt the data by performing an XOR operation using the data and the random encryption key.

13. The memory subsystem recited in claim 8, comprising a system basic input-output system (BIOS) that is adapted to generate the random encryption key each time the computer system is booted.

14. The memory subsystem recited in claim 8, wherein the memory controller is adapted to use at least one subsequent random encryption key to encrypt data.

15. A computer system, comprising:
- a hard disk that is adapted to state data for use by the computer system;
- a processor that is adapted to read data stored on the hard disk;
- a memory controller that is adapted receive a random encryption key each time the computer system is booted, to store the random encryption key in a volatile memory region in the memory controller, to receive data from the processor, to use the random encryption key to encrypt the data, and to store encrypted data in a system memory: and
- a system memory that is adapted to store encrypted data received from the memory controller.

16. The computer system recited in claim 15, wherein the memory controller is adapted to read the encrypted data from the system memory, and to decrypt the encrypted data using the random encryption key.

17. The computer system recited in claim 15, wherein the volatile memory region of the memory controller comprises a write-only/write-once register.

18. The computer system recited in claim 15, wherein the volatile memory region of the memory controller is reset when a system reset is performed.

19. The computer system recited in claim 15, wherein the memory controller is adapted to encrypt the data by performing an XOR operation using the data and the random encryption key.

20. The computer system recited in claim 15, comprising a system basic input-output system (BIOS) that is adapted to generate the random encryption key each time the computer system is booted.

\* \* \* \* \*